(12) United States Patent
Van Engelen

(10) Patent No.: US 10,874,989 B2
(45) Date of Patent: Dec. 29, 2020

(54) MULTIPURPOSE MEMBRANE CELL STACK AND METHOD OF MANUFACTURING THE SAME

(71) Applicant: Fujifilm Manufacturing Europe B.V., Tilburg (NL)

(72) Inventor: Johannes Van Engelen, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 155 days.

(21) Appl. No.: 16/087,231

(22) PCT Filed: Mar. 21, 2017

(86) PCT No.: PCT/GB2017/050780
§ 371 (c)(1),
(2) Date: Sep. 21, 2018

(87) PCT Pub. No.: WO2017/163043
PCT Pub. Date: Sep. 28, 2017

(65) Prior Publication Data
US 2019/0046928 A1 Feb. 14, 2019

(30) Foreign Application Priority Data
Mar. 22, 2016 (GB) .................................. 1604838.1

(51) Int. Cl.
*B01D 61/50* (2006.01)
*B01D 63/08* (2006.01)
*B01D 61/46* (2006.01)

(52) U.S. Cl.
CPC ............. *B01D 61/50* (2013.01); *B01D 61/46* (2013.01); *B01D 63/081* (2013.01); *B01D 63/082* (2013.01); *B01D 2313/025* (2013.01); *B01D 2313/04* (2013.01); *B01D 2313/105* (2013.01); *B01D 2315/10* (2013.01); *B01D 2321/2008* (2013.01)

(58) Field of Classification Search
CPC .......... B01D 2313/10; B01D 2313/105; B01D 2313/12; B01D 2313/125; B01D 61/46; B01D 61/50; B01D 63/082
See application file for complete search history.

(56) References Cited

U.S. PATENT DOCUMENTS

| 5,972,191 A | 10/1999 | Mani |
| 9,169,138 B2 | 10/2015 | Sparrow et al. |
| 9,782,725 B2 | 10/2017 | Liang et al. |
| 2012/0117789 A1 | 5/2012 | Liang et al. |
| 2012/0118729 A1* | 5/2012 | Liang ........................ C25B 9/00 204/267 |

(Continued)

FOREIGN PATENT DOCUMENTS

| CA | 2939347 A1 | 10/2015 |
| CN | 104084046 A | 10/2014 |
| WO | 2012/106607 A1 | 8/2012 |

*Primary Examiner* — Salil Jain
(74) *Attorney, Agent, or Firm* — Banner & Witcoff, Ltd.

(57) ABSTRACT

Membrane cell stack arrangement comprising a housing, a stack of membranes defining flow compartments and a fluid manifold system, wherein the direction of flow through the flow compartments is different to the direction of flow through entry and exit openings and the width of the entry and exit openings are each larger than 45% of the width of the flow compartment.

22 Claims, 4 Drawing Sheets

(56) References Cited

U.S. PATENT DOCUMENTS

| | | |
|---|---|---|
| 2012/0199484 A1 | 8/2012 | Liang |
| 2014/0175011 A1* | 6/2014 | Benton .................. C02F 1/445 |
| | | 210/644 |
| 2016/0346737 A1 | 12/2016 | Liang et al. |

* cited by examiner

*Fig. 1* (Comparative)

MULTIPURPOSE MEMBRANE CELL STACK AND METHOD OF MANUFACTURING THE SAME

RELATED APPLICATIONS

This application is a National Stage Application under 35 U.S.C. 371 of co-pending PCT application PCT/GB2017/050780 designating the United States and filed Mar. 21, 2017; which claims the benefit of GB application number 1604838.1 and filed Mar. 22, 2016 each of which are hereby incorporated by reference in their entireties.

FIELD OF THE INVENTION

The present invention relates to a multipurpose membrane cell stack, in particular to a membrane cell stack for ion exchange. In a further aspect the present invention relates a method of manufacturing a membrane cell stack.

PRIOR ART

International application WO 2015/153885 discloses a membrane stack arrangement comprising a plurality of aligned cell pairs, each of the plurality of aligned cell pairs including an ion concentrating compartment constructed and arranged to provide fluid flow in a first direction and an ion diluting compartment constructed and arranged to provide fluid flow in a second direction that is different from the first direction. Each of the ion concentrating compartments may comprise an anion exchange membrane, a cation exchange membrane, and a first spacer positioned between the anion exchange membrane and the cation exchange membrane, the first spacer having a masked first set of end portions and a potted second set of end portions. Each of the ion diluting compartments may comprise an anion exchange membrane, a cation exchange membrane, and a second spacer positioned between the anion exchange membrane and the cation exchange membrane, the second spacer having a potted first set of end portions and a masked second set of end portions. The masked first set of end portions of the first spacer may be aligned with the potted first set of end portions of the second spacer, and the potted second set of end portions of the first spacer being aligned with the masked second set of end portions of the second spacer. Each end portion of the first and second sets of end portions may define a channel extending therethrough, each channel being in fluid communication with those spacers through whose masked end portion the channel extends, and each channel being in fluid isolation from those spacers through whose potted end portion the channel extends. The fluid flow in each compartment has a single main direction from the respective input channel to the output channel. The disclosed electrochemical separation devices are of the cross-flow type.

U.S. patent U.S. Pat. No. 9,169,138 B discloses a water treatment system having a stack of membrane bounded compartments with internal fluid manifolds distributing input and output flows to the compartments. The main fluid flow direction is a single direction from an input channel to an output channel.

SUMMARY OF THE INVENTION

The present invention seeks to provide an improved multipurpose membrane stack arrangement for ion exchange, such as for Electrodialysis (Reversal), e.g. for desalination, or Reverse Electrodialysis (RED), e.g. for the generation of energy, and the like, with the possibility to create various specific implementations from a basic membrane cell stack design, including co-current, counter-current and cross flow types of designs.

According to the present invention, there is provided a membrane cell stack arrangement comprising a housing having a central axis; a stack of membranes, each membrane comprising a major membrane surface and being enclosed by the housing with the major membrane surface arranged substantially perpendicular to the central axis; the membrane cell stack arrangement further comprising a plurality of flow compartments each interposed at least in part between two adjacent membranes, wherein each flow compartment comprises an inflow channel, an outflow channel and a main flow channel extending between the inflow channel and the outflow channel, the inflow channel, the outflow channel and the main flow channel having a major inflow direction, a major outflow direction and a major main flow direction, respectively, wherein the major inflow direction and the major outflow direction are arranged at respective predetermined angles to the major main flow direction in a plane parallel to the major membrane surface, each inflow channel comprising an entry opening and each outflow channel comprising an exit opening, the membrane cell stack arrangement further comprising an internal fluid manifold system in communication with respective entry openings and exit openings of the inflow channels and outflow channels of the plurality of flow compartments, wherein the main flow channel has a main flow channel width ($w_m$), the entry opening has a width ($w_1$) and the exit opening has a width ($w_2$), wherein width ($w_1$) and width ($w_2$) are each larger than 45% of the main flow channel width ($w_m$).

Each flow compartment is defined at least in part by two adjacent membranes spaced apart, and comprises closed edges between these membranes, the closed edges being interrupted by an entry opening and an exit opening of the flow compartment. Each entry opening and/or each exit opening may comprise a single opening or multiple adjacent openings separated from each other by a thin wall that may have the function of flow guide element. The major inflow direction, the major outflow direction and the major main flow direction are substantially parallel to the closed edge(s) defining the inflow channel, the outflow channel and the main flow channel, respectively.

When the inflow channel and/or outflow channel is defined by two non-parallel closed edges then the major inflow direction and/or the major outflow direction can be regarded as the average direction in which fluid flows through that channel. Mathematically, if two closed edges of an inflow channel or outflow channel are at an angle of $\gamma$ degrees relative to each other, then the major inflow or outflow direction of that channel is $\tfrac{1}{2}\gamma$ degrees relative to those two closed edges.

The major inflow and major outflow directions are arranged at respective predetermined angles ($\alpha$, $\beta$) relative to the major main flow direction (10c) in a plane parallel to the major membrane surface to allow for an increased fluid flow entry area and an increased fluid flow exit area of a flow compartment, so that a larger and more efficient fluid flow can be obtained. The membrane cell stack arrangement thus provides reduced hydraulic resistance and higher membrane efficiency (ion exchange over a membrane interposed between two adjacent flow compartments). This design of a membrane cell stack arrangement allows for a choice of co-current, counter-current and cross-flow designs of adjacent flow compartments in the membrane cell stack arrangement.

In a further aspect the present invention relates to a method of manufacturing a membrane cell stack arrangement, comprising the steps of:

provide a housing having a central axis;

building a stack of membranes, each membrane having a major membrane surface and being enclosed by the housing with the major membrane surface arranged substantially perpendicular to the central axis, the membrane cell stack arrangement further comprising:

a plurality of flow compartments each interposed at least in part between two adjacent membranes, wherein each flow compartment comprises an inflow channel, an outflow channel and a main flow channel extending between the inflow channel and the outflow channel, each inflow channel having an entry opening and each outflow channel having an exit opening, the inflow channel, the outflow channel and the main flow channel having a major inflow direction, a major outflow direction and a major main flow direction, respectively, wherein the major inflow direction and the major outflow direction are arranged at respective predetermined angles to the major main flow direction in a plane parallel to the major membrane surface, wherein the main flow channel has a main flow channel width ($w_m$), the entry opening (5a) has a width ($w_1$) and the exit opening (6a) has a width ($w_2$), wherein width ($w_1$) and width ($w_2$) are larger than 45% of the main flow channel width ($w_m$);

providing an internal fluid manifold system; and installing the stack of membranes and the fluid manifold system in the housing such that the internal fluid manifold system is in communication with the respective entry openings and exit openings of the inflow channels and outflow channels of the plurality of flow compartments.

This method allows for a very efficient manufacturing of a membrane cell stack arrangement according to any one of a co-current, counter-current or cross flow set-up of the adjacent flow compartments or for any combination of co-current, counter-current or cross flow set-up.

SHORT DESCRIPTION OF DRAWINGS

The present invention will be discussed in more detail below, using a number of exemplary embodiments, with reference to the attached drawings, in which FIG. 1 shows a schematic top view of an embodiment of a prior art membrane cell stack arrangement;

DETAILED DESCRIPTION OF EXEMPLARY EMBODIMENTS

Existing cross flow designs of membrane cell stacks comprise alternating flow compartments with membranes forming the separation between the flow compartments. Inputs and outputs of the flow compartments are interconnected using a suitable manifold arrangement.

Prior art co-current and counter-current membrane cell stacks (e.g. for ion exchange) usually comprise one or more flow compartments wherein each flow compartment comprises an available fluid entry area and fluid exit area of only much less than 50% of the maximum available fluid entry area and fluid exit area. For example, in practice the available fluid entry area and fluid exit area of a prior art flow compartment may be as low as 30% or even less than 25% of a maximum available fluid entry area and fluid exit area, e.g. when circular input and output channels are used in order to also provide sufficient structural strength of the stack assembly. For example, in the prior art publication CN104084046 a membrane cell stack is disclosed wherein only about 21% of the width of the main flow channel is available for the inflow and outflow channels. Such a small percentage of an available fluid entry area and fluid exit area with respect to a maximum available fluid entry area and fluid exit area often induces a relatively high hydraulic resistance within the flow compartment during operation thereof. However, a high hydraulic resistance within the flow compartment typically reduces energy efficiency of the membrane cell stack.

Figure 1:
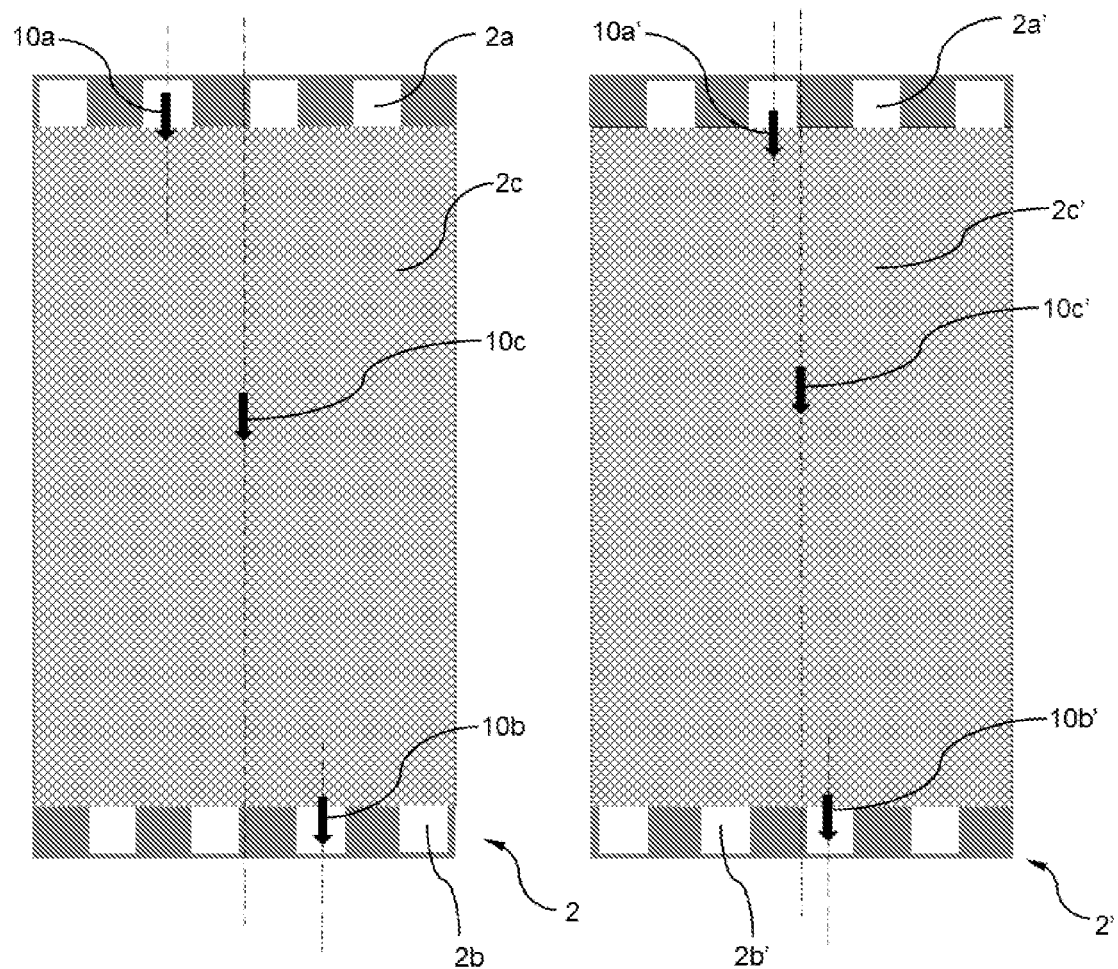

The above can be further clarified by FIG. 1, showing a simplified and schematic top view of an embodiment of a comparative membrane cell stack which does not fall within the present claims, wherein two flow compartments 2, 2' have been separated and placed side by side for clarity. In the secondary (right position) flow compartment 2', the same elements are present as in the primary (left position) flow compartment 2, but with an accent added to the respective reference numerals. In real implementations the two flow compartments 2, 2' are arranged in a stacked manner.

The Comparative membrane cell stack comprises a stack of adjacent flow compartments 2 having interposed there between a membrane, e.g. operable for ion exchange between two adjacent flow compartments 2. Each flow compartment 2 may be seen as a flat or planar flow compartment 2 having a small height relative to its width and depth. The membrane arranged between the two adjacent flow compartments 2 fluidly separates the two flow compartments 2 but allows ion exchange to occur there between during operation of the membrane cell stack when fluids flow through each flow compartment 2. Typically, one of the two adjacent flow compartments 2 is an ion concentrating compartment whereas the other of the two adjacent flow compartments 2 is an ion diluting flow compartment.

The Comparative membrane cell stack shown schematically in FIG. 1 has a rectangular configuration and each flow compartment 2, 2' comprises an inflow channel 2a, 2a' and an outflow channel 2b, 2b' (in FIG. 1 each flow compartment 2, 2' comprises four inflow channels 2a, 2a' and four outflow channels 2b, 2b'). Furthermore, the inflow channels 2a, 2a' and outflow channels 2b, 2b' are located at opposite sides of the membrane cell stack. In comparative FIG. 1, a co-current flow arrangement is shown (in a schematic manner). In a counter-current flow arrangement, the inflow channel 2a' and outflow channel 2b' would be reversed. The arrows in FIG. 1 indicate major inflow direction 10a, 10a', major outflow direction 10b, 10b' and major main flow direction 10c, 10c'.

In general thus theoretically at most 50% of the cross-section of the main flow channel 2c is available for the inflow and outflow channels 2a, 2b. As in practical implementations also care has to be taken that the structural strength of the membrane cell stack is sufficient and so an even lower percentage of the cross-section of the main flow channel 2c is available for the inflow and outflow channels, e.g. at most 40% or even as low as 30 or 21% (see above comments on the prior art publication CN104084046).

Furthermore, although not depicted in FIG. 1, it will be readily understood that the flow compartments 2, 2' of the membrane cell stack are enclosed by a housing having a central axis, wherein the membrane cell stack is arranged along the central axis, i.e. the (planar) membranes between the flow compartments 2, 2' are provided perpendicular to the central axis.

A flat or planar spacer (e.g. in the form of a spacer net) may be arranged within a main flow channel 2c of each flow compartment 2, defining a height of each flow compartment 2, i.e. defining a distance between two adjacent membranes of the membrane cell stack. The spacer net may be utilized to improve an even distribution of a fluid flowing through a flow compartment.

From FIG. 1 it becomes readily evident that during operation of the membrane cell stack fluids both enter and exit a main flow channel 2c through relatively small inflow channels 2a and outflow channels 2b. A disadvantage of such a configuration of channels is that a relatively high hydraulic resistance is obtained as well as a relatively uneven flow pattern through the main flow channels 2c, which can be considered to be rectangular in FIG. 1. Furthermore, even a spacer net may not be capable of providing sufficient flow distribution for optimal ion exchange throughout a main flow channel 2c in which it is arranged.

According to embodiments of the present invention, to utilize each main flow channel 2c in a more efficient manner, both inflow channels 2a and outflow channels 2b should have a largest possible inflow area/opening and outflow area/opening with respect to the cross-section of the main flow channels 2c interposed there between. Doing so allows fluids to flow through each main flow channel 2c in a more evenly distributed manner and hydraulic resistance is reduced and, ultimately, ion exchange across the membranes is improved.

Figure 2:
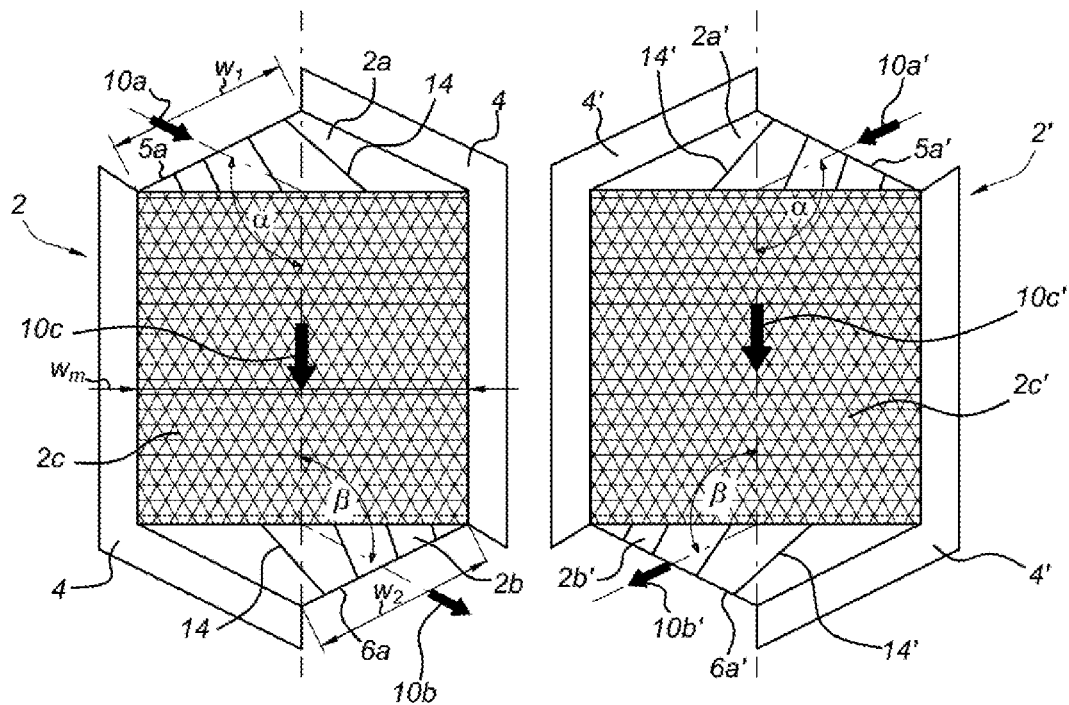
FIG. 2 shows a top view of an embodiment of two flow compartments according to the present invention.

FIG. 2 shows a top view of an embodiment of two flow compartments 2 of a membrane cell stack arrangement 1 according to the present invention, wherein the two flow compartments 2 have been separated and placed side by side for clarity. In the secondary (right position) flow compartment 2', the same elements are present as in the primary (left position) flow compartment 2, but with an accent added to the respective reference numerals. In real implementations the two flow compartments 2 are arranged in a stacked manner.

In the embodiment shown, the membrane cell stack arrangement 1 comprises two types of flow compartments 2 positioned alternatively in the stack. A membrane of the membrane cell stack 1 is not depicted as it may be arranged below or above the flow compartment 2, wherein the membrane fluidly separates two adjacent flow compartments 2 and allows ion exchange there between. In an embodiment one type of flow compartment 2 may be an ion concentrating compartment whereas the other type of flow compartment 2 may be an ion diluting compartment, or vice versa.

The membrane cell stack arrangement 1 further comprises an (upper) inflow channel 2a and an (upper) outflow channel 2b as part of the flow compartment 2, and a secondary (or lower) inflow channel 2a' and a secondary (or lower) outflow channel 2b' as part of the lower flow compartment 2'. Between the upper inflow channel 2a and upper outflow channel 2b there is provided an upper main flow channel 2c, and between the lower inflow channel 2a' and lower outflow channel 2b' there is provided a main lower flow channel 2c'.

In an embodiment the upper main flow channel 2c and/or the lower main flow channel 2c' may each comprise an upper spacer net and a lower spacer net, respectively. Each spacer net may improve flow distribution through the main flow channel 2c, 2c' in which it is arranged and when the membrane cell stack 1 is in operation. Furthermore, in order to fluidly separate the adjacent flow compartments, a gasket 4 may be provided along a part of the circumference of the flow compartments 2, leaving open an entry opening 5a for the inflow channel 2a and an exit opening 6a for the outflow channel 2b. Gasket 4 may form closed edges defining the flow compartment 2.

In an embodiment the main flow channels 2c may comprise, for example, a rectangular or square shape, e.g. a planar rectangular or planar square shape as outlined by the hatching in FIG. 2. The main flow channel 2c may comprise a substantially uniform thickness or height. The main flow channel 2c preferably occupies more than 50% of the total flow channel area as defined by the closed edges of the flow compartment 2, more preferably more than 60%.

According to the present invention, flow distribution through the main flow channels 2c can be improved by enlarging (widening) the inflow channel 2a and outflow channel 2b with respect to a width of the main flow channel 2c. As the flow compartment 2 may have a uniform height or thickness, enlargement of the inflow channels 2a and outflow channels 2b is accomplished by widening said channels 2a, 2b. Such widening is made possible by increasing a width $w_1$ of each of the inflow channels 2a and a width $w_2$ of each of the outflow channels 2b with respect to a width $w_m$ of the main flow channels 2c.

The inflow channel 2a has an entry opening 5a, and the outflow channel 2b has an exit opening 6a, which are in communication with an internal fluid manifold system of the membrane cell stack arrangement 1. In the present invention embodiments, the main flow channel 2c has a main flow channel width $w_m$, a width $w_1$ of the entry opening 5a and a width $w_2$ of the exit opening 6a wherein each of the width $w_1$ and the width $w_2$ are larger than 45% of the main flow channel width $w_m$, preferably larger than half of the main flow channel width $w_m$, i.e. the ratio $w_1/w_m$ is larger than 0.45, preferably larger than 0.5, and the ratio $w_2/w_m$ is larger than 0.45, preferably larger than 0.5.

Preferably the width $w_m$ of the main flow channel 2c is larger than 50% (more preferably larger than 75%) of the total width of the flow compartment 2. Thus preferably the main flow channel 2c forms a direct straight path from inflow channel 2a to outflow channel 2b without 180° turns. This configuration reduces pressure drop across the length of the compartment 2.

In one embodiment one or more of the flow compartments present in the membrane cell stack is constructed such that the major main flow direction changes once in the main flow channel 2c by an angle of 180°. In this embodiment the inflow channel 2a and the outflow channel 2b may be located adjacent to each other. This embodiment almost doubles the effective length of the main flow channel and almost doubles the residence time of fluid within the relevant flow compartment at an identical flow velocity. This embodiment is particularly useful for desalination of highly concentrated fluids.

In light of the above and with reference to FIG. 2, the membrane cell stack arrangement 1 of the present invention thus comprises a plurality of flow compartments 2 having an inflow channel 2a, an outflow channel 2b, and a main flow channel 2c extending there between. The inflow channel 2a has a major inflow direction 10a and the outflow channel 2b has a major outflow direction 10b, wherein the major inflow and major outflow direction 10a, 10b are arranged at respective predetermined angles α, β to a major main flow direction 10c of the main flow channel 2c. Each flow compartment 2 is defined at least in part by two adjacent membranes spaced apart, and comprises closed edges between these membranes, the closed edges being interrupted by an entry opening 5a and an exit opening 6a. The major inflow direction 10a, the major outflow direction 10b and the major main flow direction 10c are substantially parallel to the closed edge(s) defining the inflow channel 2a, the outflow channel 2b and the main flow channel 2c, respectively. The closed edges may be considered to comprise substantially straight sides (see e.g. the description of the embodiment with reference to FIG. 4 below). The closed edges are e.g. made of a polymeric material, and may comprise a sealing material such as an adhesive.

In real applications the flow compartment 2 may be suitable to function as an ion concentrating compartment or an ion diluting compartment, e.g. the two types of flow compartments 2 as shown in FIG. 2, wherein input and output flow of the two types of flow compartments 2 in a stacked configuration can be easily held separate.

Without departing from the teachings of the present invention, in the above paragraph the terms "upper" and "lower" have been dispensed with as, in principle, the "upper" and "lower" flow compartment 2 may have comparable geometries and dimensions, except that they may be mirrored with respect to each other in the membrane cell stack arrangement 1 as indicated in FIG. 2. Also, when used, the terms "upper" and "lower" may be interchanged and do not specify limiting features as such. Further the terms "upper" and "lower" do not specifically indicate a vertical displacement; it may also indicate a horizontal displacement, i.e. the central axis of the housing may be vertical or horizontal or even oblique.

A significant advantage of the predetermined angles α, β at which the major inflow direction 10a and major outflow direction 10b are arranged with respect to the major main flow direction 10c, respectively, is that fluids can enter/exit the main flow channels 2c over a wider area. So instead of having a width $w_1, w_2$ for fluid entry/exit of e.g. maximum 40% of a width $w_m$ of the main flow channels 2c, the predetermined angles α, β allow for a width $w_1, w_2$ for fluid entry/exit of e.g. 70% of the width $w_m$ of the main flow channels 2c. The increased width $w_1, w_2$ of the inflow and outflow channels 2a, 2b provides a more evenly distributed flow pattern within the upper and lower main flow channels 2c, thereby yielding improved ion exchange there between. Furthermore, the result will be less 'dead spaces' in a flow compartment 2, and lower fouling in the membrane cell stack arrangement 1.

As mentioned above, the membrane cell stack arrangement 1 comprises a plurality of flow compartments 2 each being interposed at least in part between two adjacent membranes. In a typical embodiment, between two adjacent flow compartments 2 there is provided at least in part a membrane through which ion exchange may occur.

Each of the plurality of flow compartments 2 comprises an inflow channel 2a, an outflow channel 2b, and a main flow channel 2c extending there between. The inflow channel 2a, the outflow channel 2b and the main flow channel 2c have a major inflow direction 10a, a major outflow direction 10b and a major main flow direction 10c, respectively, wherein the major inflow direction 10a and the major outflow direction 10b are arranged at respective predetermined angles α, β to the major main flow direction 10c in a plane parallel to the major membrane surface.

As mentioned above, the direction of the flows in the inflow channel 2a, main flow channel 2c and outflow channel 2b may be related to the closed edges of the flow compartment 2. As an alternative, the term 'major' in relation to the various directions as used in this description may be understood as an overall average direction of a fluid flow through the respective part of the flow compartment in operation.

As already mentioned hereinabove, an advantage of the predetermined angles α, β at which the major inflow and major outflow direction 10a, 10b are arranged with respect to the major main flow direction 10c is that a more evenly distributed flow pattern is obtained through each main flow channel 2c because fluids enter and exit each main flow channel 2c over a larger width $w_1, w_2$ thereof, facilitating an improved fluid flow distribution within each main flow channel 2c and reducing hydraulic resistance.

In an embodiment, the major inflow direction 10a is substantially parallel to the major outflow direction 10b, i.e. angles α and β are identical, such as shown in the embodiment of FIG. 2. It is clear that the major inflow and major outflow direction 10a, 10b are parallel as a result of arranging the inflow and outflow channel 2a, 2b at diagonal opposite sides in the flow compartment 2. In this way two types of flow compartments 2 can be stacked with the major main flow direction 10c of adjacent flow compartments 2 the same (co-current) or with opposite major main flow direction 10c (counter-current). This could also be achieved by having the major inflow direction 10a and major outflow direction 10b at an angle to each other, i.e. by having the inflow and outflow channel 2a, 2b at mirrored opposite sides in the flow compartment 2 (i.e. both at the left side for the left type of flow compartment 2 in FIG. 2, and both at the right side for the right (secondary) type of flow compartment 2'). This is shown e.g. in the embodiment of FIG. 3 discussed in further detail below.

For example, in the embodiment as shown in FIG. 2, the major main flow directions 10c of at least a part of adjacent flow compartments 2 are in co-current orientation. This embodiment is clearly indicated by the arrows in FIG. 2, indicating the major main flow directions 10c in the same direction.

In an alternative embodiment, the major main flow directions 10c of at least a part of adjacent flow compartments 2 are in counter-current orientation. This embodiment is obtained when the depicted major main flow directions 10c of the upper and lower main flow channels 2c would be arranged in opposite directions, e.g. by exchanging the inflow channel 2a' and outflow channel 2b' in the configuration shown in FIG. 2.

As depicted in FIG. 2, in an embodiment one or more of the inflow channels 2a and outflow channels 2b may be provided with flow guide elements 14. In addition to the earlier described structural features, the flow guide elements 14 also facilitate to obtain a uniform flow distribution within the main flow channels 2c and as a result improve ion exchange efficiency therein.

Figure 3:
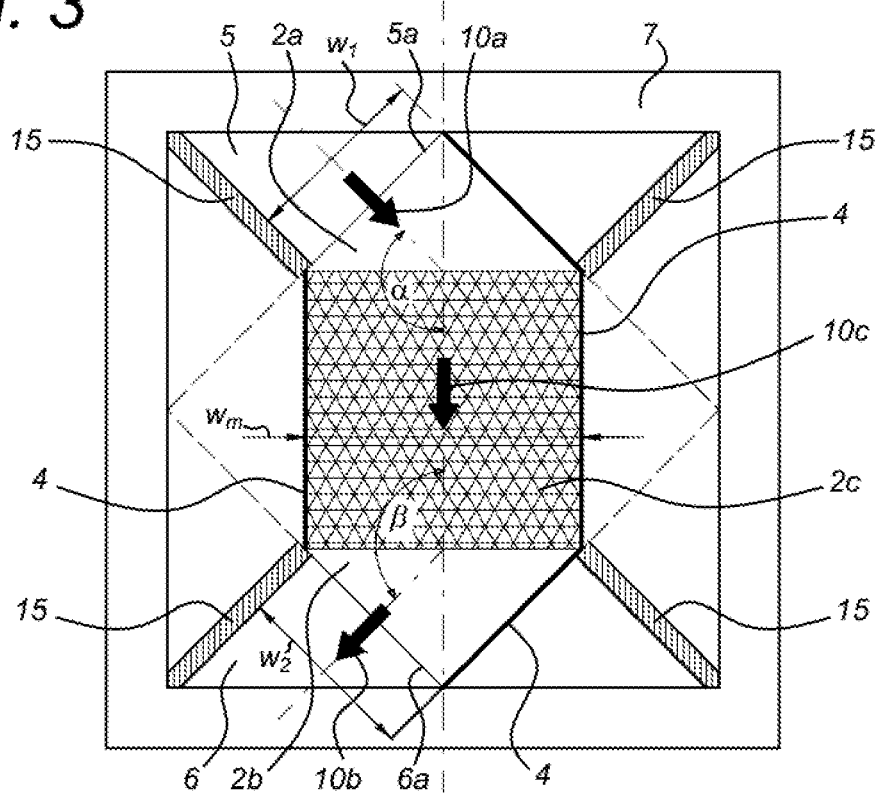
FIG. 3 shows a top view of an embodiment of a membrane cell stack arrangement according to the present invention.

FIG. 3 shows a cross-sectional view of an embodiment of a membrane cell stack arrangement 1 allowing a choice of co-current, counter-current, or cross-current flow arrangements of adjacent flow compartments 2. The stack of flow compartments 2 (with membranes and if applicable spacers therebetween) is accommodated in the housing 7, which in this embodiment is a square (more generically a rectangular) housing 7. The cross-sectional view of FIG. 3 shows a single flow compartment 2, of which the major inflow direction 10a and main outflow direction 10b are at an angle to each other, and both are at the predetermined angles α, β to the major main flow direction 10c. In the symmetric structure as shown, the predetermined angles α, β are both 135°. Also shown are the gaskets 4 forming closed edges which define the major flow directions through the flow compartment 2 visible in FIG. 3. Due to the symmetric configuration of the housing 7, it is possible to have inside the housing 7 an input channel 5 and an output channel 6 associated with a group of flow compartments 2 (e.g. a concentrate flow through the entire membrane cell stack arrangement 1). This is elucidated in further detail below. Because of the symmetric nature of the embodiment shown, it is possible to have adjacent flow compartments 2 to be in co-current, counter-current and even in cross-current orientation. Also multiple flows can be accommodated using this stack structure. Furthermore, the position of an input channel 5 and output channel 6 associated with a group of flow compartments 2 can be varied. In FIG. 3. with a dashed line elements of an adjacent flow compartment 2'are indicated, rotated 90° relative to flow compartment 2.

Further, the skilled person will understand that the major inflow and major outflow direction 10a, 10b may be considered to be defined as being substantially perpendicular to an entry opening 5a with width $w_1$ of the inflow channel 2a and an exit opening 6a with width $w_2$ of the outflow channel 2b, respectively, for the preferred angles α, β of 135° as exemplified in FIG. 3.

From the embodiments shown in and described with reference to FIGS. 2 and 3, the predetermined angles α, β clearly allow the width $w_1$, $w_2$ of the inflow and outflow channel 2a, 2b to be larger than 45% of the width $w_m$ of the main flow channel 2c, thereby allowing an improved distributed fluid entry/exit through the main flow channel 2c. Thus the ratio $w_1/w_m$ is allowed to be greater than 0.45, preferably greater than 0.5. The ratio $w_1/w_m$ may be calculated by the formula $w_1/w_m=1/(2 \sin \alpha)$ and the ratio $w_2/w_m$ may be calculated by the formula $w_2/w_m=1/(2 \sin \beta)$ thereby assuming that the thickness of the closed edges is the same for the main flow channel 2c and the inflow and outflow channel 2a, 2b.

The present invention provides a membrane cell stack arrangement 1 (sometimes abbreviated herein to "membrane cell stack 1"), comprising a housing 7 (not shown in FIG. 2) having a central axis and a stack of membranes, each membrane comprising a major membrane surface and being enclosed by the housing 7 with the major membrane surface arranged substantially perpendicular to the central axis. The housing 7 optionally comprises a frame which holds the component parts of the stack of membranes tightly together. Such a frame can be useful for preventing fluid leakage.

Figure 4:
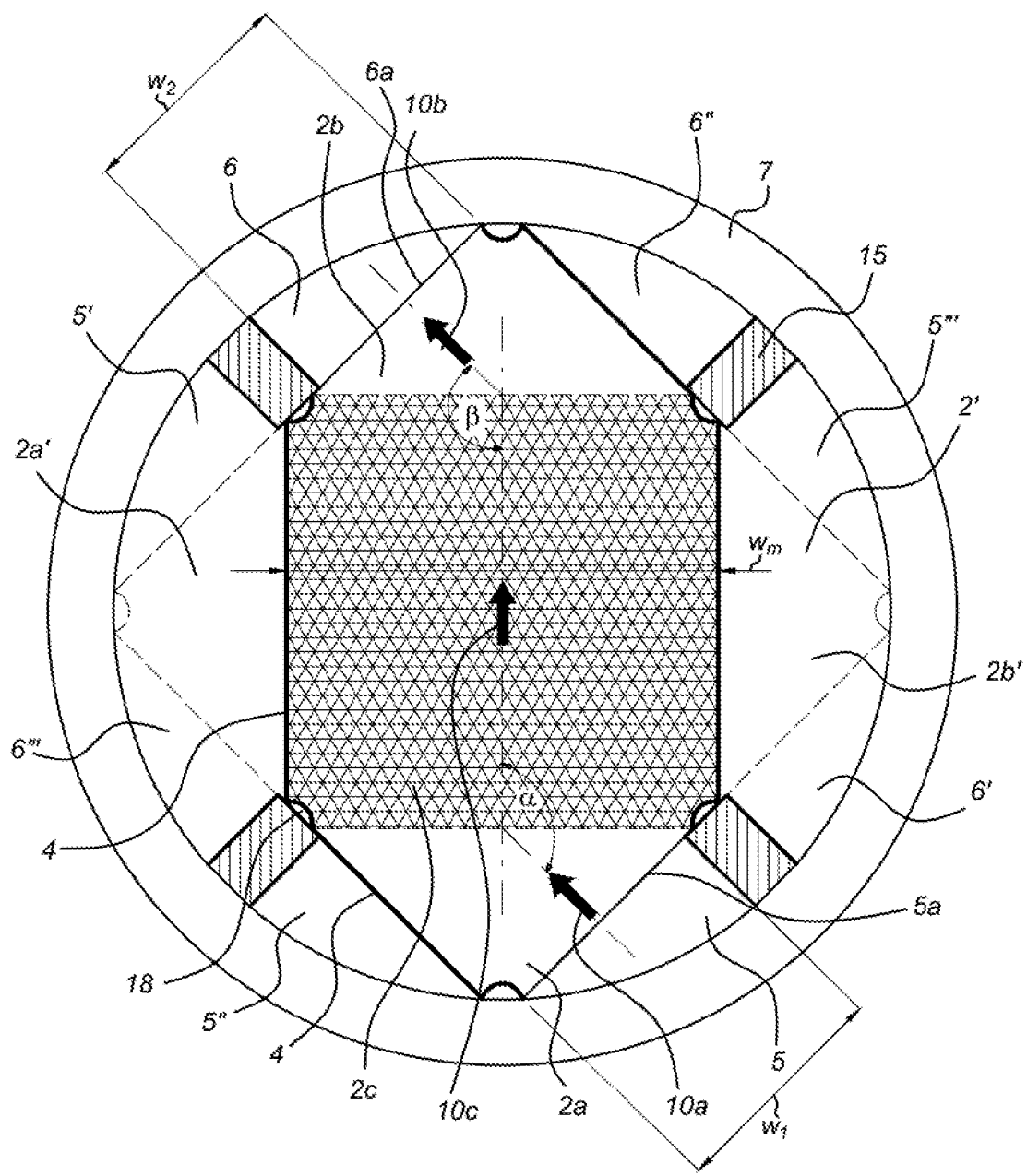
FIG. 4 shows a top view of another embodiment of a membrane cell stack arrangement according to the present invention.

FIG. 4 shows a cross-sectional view of a further embodiment of a membrane cell stack arrangement 1 according to the present invention. The membrane cell stack arrangement 1 is here provided with a tubular housing 7, in this specific exemplary embodiment having a circular cross-section. In the embodiment depicted a flow compartment 2 is shown (with inflow channel 2a, main flow channel 2c and outflow channel 2b), and with a dashed line, elements of an adjacent flow compartment 2', rotated 90° relative to flow compartment 2. The major main flow direction 10c of the main flow channel 2c of the flow compartment is perpendicular to a major main flow direction (not shown) of the adjacent flow compartment 2'. As with the embodiment in FIG. 3, the predetermined angles α, β allow the membrane cell stack arrangement 1 to have a largest possible fluid entry area into and fluid exit area out of the main flow channels 2c to provide improved and even flow distribution and to reduce hydraulic resistance.

This embodiment can be readily generalized to an embodiment wherein the major main flow directions 10c of at least a part of adjacent flow compartments 2 (or more precise of adjacent main flow channels 2c) are in cross-current orientation.

In a further embodiment, as shown in the cross-sectional view of FIG. 4, each flow compartment 2 comprises six (or more generally at least four) straight sides, of which four straight sides are aligned with the closed edges forming the flow compartment, and a corner recess 18 is present between each two adjacent straight sides. The further straight sides then correspond to the entry opening 5a and exit opening 6a. In this embodiment a corner recess 18 allows the plurality of flow compartments 2 of the membrane cell stack arrangement 1 to be sealed from each other using e.g. a curable potting agent at the corner recess 18. To separate various flows in the membrane cell stack arrangement 1 a channel-forming structure 15 is provided, which seals the various channels with respect to each other and the inside surface of the housing 7.

As elaborated earlier, the predetermined angles α, β allow for an increased width $w_1$ of an inflow channel 2a and for an increased width $w_2$ of an outflow channel 2b of more than 45% of the width $w_m$ of a main flow channel 2c. For example, in an advantageous embodiment the predetermined angles α and β may be between 100° and 170°, e.g. between 110° and 150° or between 125° and 145°. In a specific embodiment the predetermined angles are about 135 degrees, so that the width $w_1$, $w_2$ of the inflow/outflow channel 2a, 2b is about 71% ($1/(2 \sin 135°) \approx 0.71$) of the width $w_m$ of the main flow channel 2c. In another preferred embodiment, depicted in FIG. 5, the predetermined angles are about 112.5 degrees, so the width $w_1$, $w_2$ of the inflow/outflow channel 2a, 2b is about 54% of the width $w_m$ of the main flow channel 2c. For the more extreme case wherein the predetermined angles are about 100 degrees the width $w_1$, $w_2$ of the inflow/outflow channel 2a, 2b is about 51% of the width $w_m$ of the main flow channel 2c while for the case the predetermined angles are about 170 degrees the width $w_1$, $w_2$ of the inflow/outflow channel 2a, 2b is about 288% of the width $w_m$ of the main flow channel 2c. For the case wherein the predetermined angles are about 110 degrees the width $w_1$, $w_2$ of the inflow/outflow channel 2a, 2b is about 53% of the width $w_m$ of the main flow channel 2c and for the case wherein the predetermined angles are about 145 degrees the width $w_1$, $w_2$ of the inflow/outflow channel 2a, 2b is about 87% of the width $w_m$ of the main flow channel 2c.

Figure 5:
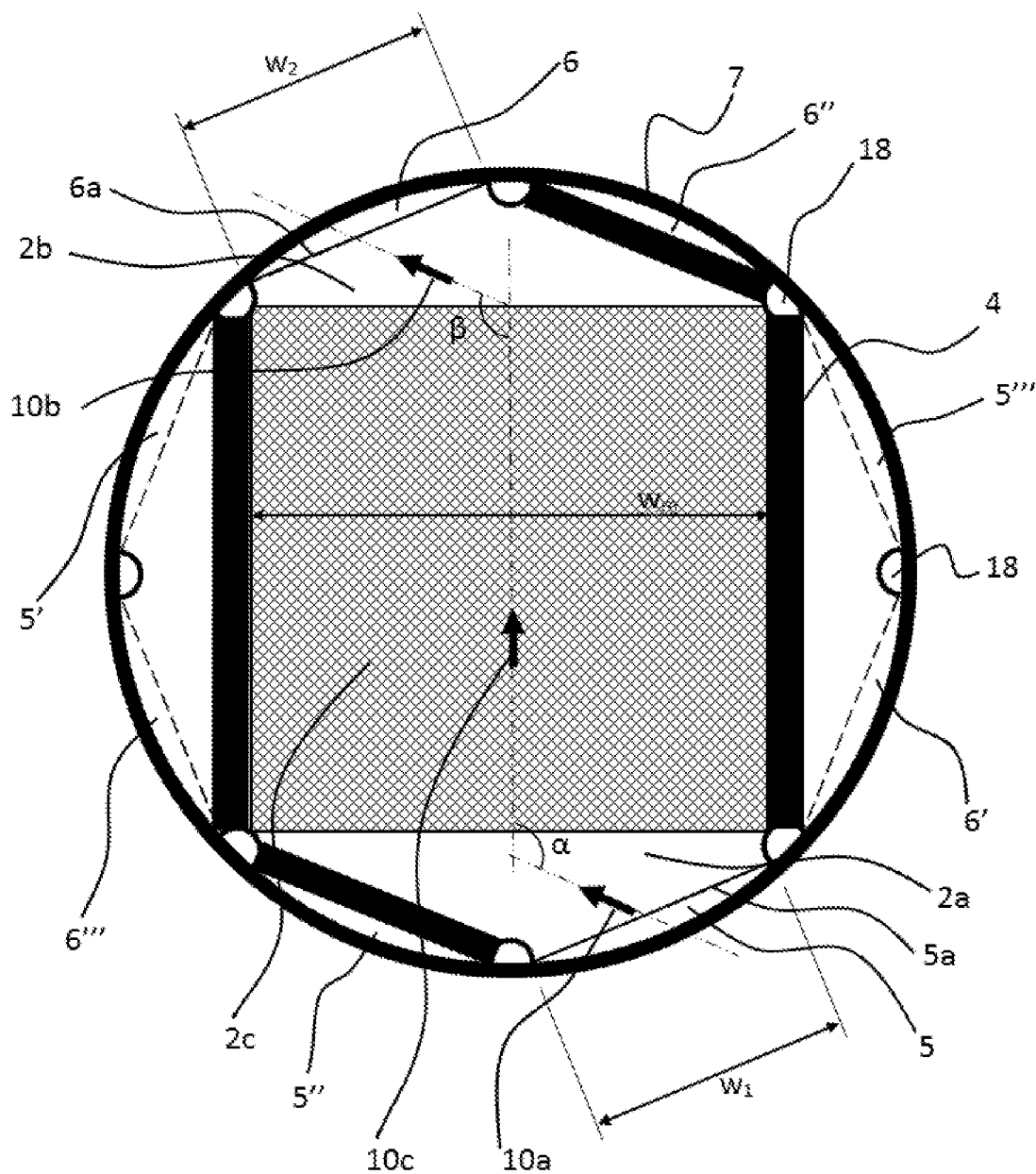
FIG. 5 shows a top view of a further embodiment of a membrane cell stack arrangement according to the present invention.

In the preferred embodiment shown in FIG. 5 wherein the predetermined angles α and β are about 112.5 degrees, the stack of membranes may have the shape of an octagon, making separate channel-forming structures 15 superfluous.

For the avoidance of doubt, for a fluid passing in a straight line through the inflow channel 2a, the main flow channel 2c and the outflow channel 2b without changing direction the angles α and β would both be 180°. The predetermined angles α and β are not 0° or 180°.

Preferably each flow compartment 2 has a hexagonal shape and comprises six corner recesses 18. Membranes may be stacked such that part or all of the flow compartments 2 have a main flow direction 10c perpendicular to the main flow direction 10c in the next adjacent flow compartment.

The optional corner recesses 18 together with the inner wall of the housing 7 may be used to provide for eight properly defined spaces for a fluid-tight sealing material.

The stack of membranes also may have a hexagonal shape. When the stack of membranes has a hexagonal shape not more than three different configurations can be realized, while for an octagonally shaped stack of membranes four different configurations are possible, as discussed below in more detail. In practical implementations the width $w_1$, $w_2$ and $w_m$ will be somewhat smaller than indicated in the drawings due to the width of the gasket forming closed edges of the flow compartments. Thus in one embodiment the membrane cell stack is configured such that the membrane cell stack may desalinate more than one fluid stream simultaneously, e.g. two fluid streams. The chemical composition of such fluid streams may be different to each other or the same as each other. In another embodiment the membrane cell stack is configured such that the membrane cell stack may generate electricity from the simultaneous mixing of more than one fluid (e.g. concentrated ionic solutions) with one or more fluids having a lower ionic concentration (dilute ionic solutions). As mentioned earlier, the major inflow direction (10a) and the major outflow direction (10b) may be substantially parallel, or the major inflow direction (10a) may be at an angle to the major outflow direction (10b), e.g. an angle of between 10° and 170°.

A cross-current orientation for the membrane cell stack arrangement 1 having a circular housing 7 is also readily possible as exemplified in the embodiments of FIGS. 4 and 5. Such a cross-current orientation can be readily obtained by arranging the subsequent flow compartments 2 with fluid connection to the proper respective input and output channel 5, 6 and 5', 6'. The same housing allows for a co-current and a counter-current orientation between adjacent flow compartments by using respective input and output channels 5, 6 and 5", 6" or 5', 6' and 5''', 6'''. Thus the membrane cell stack arrangement 1 of the present invention can be constructed to contain solely co- and/or counter-current-oriented membrane flow compartments, or solely cross-current-oriented flow compartments, or a combination of co-, counter and cross-current-oriented flow compartments. As described above for the embodiment depicted in FIGS. 4 and 5, flow compartments 2 with four different configurations can be realized with the membrane cell stack arrangement 1 of the present inventions allowing four different fluids to be treated in the membrane cell stack arrangement 1. Thus the membrane cell stack arrangement 1 optionally comprises repeating units of, for example, up to four flow compartments 2, depending on the construction of the membrane cell stack arrangement 1.

An advantage of the circular housing 7 is that it allows for easy manufacturing of the membrane cell stack arrangement 1 as it can be made, e.g., from tubular material having a circular cross-section, such as a pipe. In further embodiments, the housing 7 may comprise one of a circular cross-section; an elliptical cross-section; a rectangular cross-section; a polygonal cross-section (e.g. hexagonal, octagonal, . . . ).

The membrane cell stack arrangement 1 of the present invention typically comprises a stacked arrangement of flow compartments 2 as disclosed above, typically in pairs of an upper flow compartment 2 and a lower flow compartment 2' separated by a membrane interposed there between. The upper flow compartment 2 may act as an ion concentrating compartment and the lower flow compartment 2' may act as an ion diluting compartment, or vice versa.

Once again, the terms "upper" and "lower" may be used to distinguish between two adjacent flow compartments 2 as used in the present invention, but it should be clear that the upper and lower flow compartments 2 have similar geometries and can be interchanged.

Furthermore, from the exemplary embodiment as described above with reference to FIGS. 2 to 5 it can be inferred that the membrane cell stack arrangement 1 may be provided with inflow channels 2a and outflow channels 2b of a group of flow compartments 2 having the same orientation of major main flow direction 10c, major inflow direction 10a and major outflow direction 10b that are in fluid communication with an input channel 5 and output channel 6, respectively. That is, the input channel 5 and output channel 6 may collectively couple all flow compartments 2 associated with e.g. either an ion concentrating compartment or an ion diluting compartment. Such a collective coupling of flow compartments 2 may be advantageously obtained in an embodiment of the membrane cell stack arrangement 1 wherein the input channel 5 and the output channel 6 are arranged parallel to the central axis. For example, in case the housing 7 comprises an elongated tubular housing enclosing or encircling a stacked arrangement of pairs of adjacent flow compartments 2 of a different type, then an input channel 5 may be positioned inside the housing 7 parallel to the central axis for fluidly coupling one or more inflow channels 2a and an output channel 6 may be positioned inside the housing 7 parallel to the central axis for fluidly coupling one or more outflow channels 2b, see e.g. the embodiments shown in FIGS. 4 and 5.

In more generic wording, a membrane cell stack arrangement 1 is provided according to an embodiment of the present invention, comprising a housing 7 having a central axis, a stack of membranes, each membrane comprising a major membrane surface and being enclosed by the housing 7 with the major membrane surface arranged substantially perpendicular to the central axis. The membrane cell stack arrangement 1 further comprises a plurality of flow compartments 2 each interposed at least in part between two adjacent membranes, wherein each flow compartment 2 comprises an inflow channel 2a, an outflow channel 2b, and a main flow channel 2c extending between the inflow channel and the outflow channel. An internal fluid manifold system comprising an input channel (5) and an output channel (6) is provided in communication with respective entry openings 5a and exit openings 6a of the inflow channels 2a and outflow channels 2b of the plurality of flow compartments 2. The internal fluid manifold system may be provided inside the housing 7 or as part of the housing structure. Furthermore, the main flow channel 2c has a main flow channel width $w_m$, a width $w_1$ of the entry opening 5a and a width $w_2$ of the exit opening 6a, wherein width ($w_1$) and width ($w_2$) are larger than 45% of the main flow channel width $w_m$, preferably larger than half the main flow channel width $w_m$. This generic embodiment may be combined with the features of any of the other embodiments described herein.

In a typical embodiment, the membrane cell stack arrangement 1 may comprise two, three, or even four groups of flow compartments 2 that are fluidly separate, i.e. the groups are fluidly isolated or unconnected. These groups of flow compartments are fluidly unconnected and are each coupled to separate input channels 5, 5', 5", 5''' and output channels 6, 6', 6", 6'''.

The membrane of the membrane cell stack arrangement 1 of the present invention embodiments may comprise an active area having a rectangular shape. The rectangular shape may correspond to a shape of the main flow channel 2c as depicted in the embodiments of FIGS. 2-5. In an embodiment the active area of the membrane may have a square shape. Also, in an advantageous embodiment it is possible that the membrane comprises an active area having a hexagonal shape. E.g. when having a co-current or counter-current embodiment, it would then be possible to also use the area of the inflow channel 2a and/or outflow channel 2b effectively for ion exchange. In this embodiment, see FIGS. 2, 4 and 5, the active area is defined between the sides of the inflow and outflow channel 2a, 2b and sides of the main flow channel 2c in addition to a rectangular area of the main flow channel 2c. As a result a hexagonal active area of the membrane is obtained over which ion exchange is possible.

The membrane is preferably an ion exchange membrane, for example a standard ion exchange membrane, a monovalent ion exchange membrane, a bipolar ion exchange membrane or an ion selective ion exchange membrane. The membrane cell stack arrangement 1 may comprise one type of ion exchange membrane or a combination of several of the types described above.

The membranes may have a smooth surface or may have a profiled surface, i.e. a textured surface profile. Thus in a preferred embodiment at least one major membrane surface of at least one membrane comprises a textured surface profile. One or both surfaces of an ion exchange membrane may have profiles in the form of ribs and/or protrusions having a height between, for example, 5 and 800 μm depending on the desired function. Protrusions of a low height may enhance the turbulence of the fluid flowing through the flow compartment 2. Higher protrusions may contribute to keeping the membranes of a flow compartment 2 apart thereby making spacers superfluous. Examples of suitable protrusions include circular cones, multi-angular pyramids (e.g. triangular pyramidal, square pyramidal and hexagonal pyramidal), hemispheres, mesas (e.g. square, triangular and circular mesas), domes, circular truncated cones, truncated pyramids, diamonds, short ridges, and combinations of two or more of the foregoing. Preferred are protrusions which have an average length (L) to average width (W) ratio of 10:1 to 1:10, more preferably 7:1 to 1:7, especially 5:1 to 1:5, more especially 2.5:1 to 1:2.5, when measured at the base of the protrusion. These preferences arise because better convection and lower blockage problems can often be obtained with the aforementioned L to W ratios than when continuous ribs are used where a particle may completely block the passage of liquid between two ribs. Preferably the textured surface profile comprises protrusions at least 80% (preferably 100%) of which have a maximum dimension in all directions (length, width and height) of less than 20 mm. Preferably the textured surface profile comprises protrusions which have a maximum dimension in all directions (length, width and height) of 0.04 to 10 mm, more preferably 0.05 to 6 mm. Preferably the textured surface profile comprises protrusions which are separated from each other by an average of at least 0.1 mm, more preferably at least 0.5 mm, e.g. by 1, 2, 4, 8 or 12 mm.

In a further aspect the invention relates to a method of manufacturing a membrane cell stack arrangement 1, e.g. as disclosed above, comprising the steps of:
  providing a housing 7 having a central axis; and
  building a stack of membranes, each membrane having a major membrane surface and being enclosed by the housing 7 with the major membrane surface arranged substantially perpendicular to the central axis, wherein the membrane cell stack arrangement 1 further comprises
    a plurality of flow compartments 2, each interposed at least in part between two adjacent membranes, wherein each flow compartment 2 comprises an inflow channel 2a, an outflow channel 2b and a main flow channel 2c extending there between, each inflow channel having an entry opening 5a and each outflow channel having an exit opening 6a,
    the inflow channel 2a, the outflow channel 2b, and the main flow channel 2c having a major inflow direction 10a, a major outflow direction 10b, and a major main flow direction 10c, respectively, wherein the major inflow direction 10a, and the major outflow direction 10b, are arranged at respective predetermined angles α, β to the major main flow direction 10c, in a plane parallel to the major membrane surface, wherein the main flow channel has a main flow channel width ($w_m$), the entry opening 5a has a width ($w_1$) and the exit opening 6a has a width ($w_2$), wherein width ($w_1$) and width ($w_2$) are each larger than 45% (more preferably larger than 50%) of the main flow channel width ($w_m$);
    providing an internal fluid manifold system; and
    installing the stack of membranes and the fluid manifold system in the housing 7 such that the internal fluid manifold system is in communication with the respective entry openings and exit openings of the inflow channels and outflow channels of the plurality of flow compartments.

In an advantageous embodiment the step of building the stack of membranes may comprise placing a membrane in the housing, placing a spacer or a gasket on top of the membrane and placing a membrane on top of the spacer or gasket wherein one of the membranes is an anion exchange membrane and the other a cation exchange membrane.

In a further advantageous embodiment the step of building the stack of membranes may comprise placing a first membrane, e.g. a cation exchange membrane, in the housing and placing a second membrane, e.g. an anion exchange membrane, on top of the first membrane, wherein both membranes are secured together along specific sides by e.g. an adhesive or by ultrasonic welding. In this embodiment the height of the flow compartment 2 may be maintained for instance by including particles of a desired size into the adhesive or by providing membranes having a surface with profiles of a desired height. In this embodiment the adhesive forms the closed edges of the flow compartment 2.

In an even further advantageous embodiment, the step of building the stack of membranes may comprise building the stack as described above outside the housing 7 and subsequently placing and securing the stack inside the housing 7. The complete stack may be built first and subsequently placed and secured in the housing 7 or two or more stacks may be built and subsequently placed and secured in the housing 7 one after the other.

The membrane cell stack arrangement 1 is very suitable for applications having more than two groups of flow compartments, i.e. having a repeating cell of three or four flow compartments, such as an electrodialysis metathesis configuration. Such a configuration comprises a first flow compartment defined at least in part by two adjacent membranes wherein one membrane is a standard anion exchange membrane and the other a standard cation exchange membrane, a second flow compartment sharing the standard cation exchange membrane and further defined by a monovalent anion exchange membrane, a third flow compartment sharing the monovalent anion exchange membrane and further defined by a monovalent cation exchange membrane, and a fourth flow compartment sharing the monovalent cation exchange membrane and further defined by a standard anion exchange membrane which partly defines the first flow compartment of a next repeating cell. For each of these four groups of compartments an input channel and an output channel is available that are fluidly separate, i.e. unconnected. The flow direction in adjacent flow compartments may be either cross-current for all compartments or alternatingly cross-current and co- or counter-current. The first and third flow compartments are preferably ion diluting compartments and the second and fourth flow compartments are preferably ion concentrating compartments, or vice versa. Further the membrane cell stack arrangement 1 is very suitable for electrodialytic processes having two groups of flow compartments wherein counter-current is desired, the main advantage being the low pressure drop and the homogeneous flow distribution related to the wider inflow and outflow channels compared to prior art arrangements.

As explained above with reference to various exemplary embodiments, it is possible to provide a membrane cell stack arrangement for various applications in a co-current, counter-current, or cross flow set-up of adjacent flow compartments. This allows to provide a membrane cell stack arrangements for an electrodialysis device, a reverse electrodialysis (RED) device and even further alternatives. Also, different flow set-ups may even be combined in a single device, using proper inflow and outflow connections and manifolds to individual flow compartments.

Among applications can be mentioned desalination of sea or brackish water, demineralization of process water in general, of produced water from the oil and gas industry, of cheese whey and of sugar syrup, tartaric stabilization of wine, (de)acidification of fruit juices, recycling of industry and agricultural water, acid recovery, (table) salt production and energy generation.

Thus the present invention also provides electrodialysis devices and reverse electrodialysis devices comprising the membrane cell stack arrangement according to the first aspect of the present invention as well as the use of such an electrodialysis device for treating aqueous liquids and the use of such a reverse electrodialysis device for generating electricity.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A membrane cell stack arrangement, comprising
a housing having a central axis;
a stack of membranes, each membrane comprising a major membrane surface and being enclosed by the housing with the major membrane surface arranged substantially perpendicular to the central axis;
the membrane cell stack arrangement further comprising a plurality of flow compartments each interposed at least in part between two adjacent membranes, wherein each flow compartment comprises an inflow channel, an outflow channel, and a main flow channel extending between the inflow channel and the outflow channel,
the inflow channel, the outflow channel and the main flow channel having a major inflow direction, a major outflow direction and a major main flow direction, respectively, wherein the major inflow direction and the major outflow direction are arranged at respective predetermined angles to the major main flow direction in a plane parallel to the major membrane surface,
each inflow channel comprising an entry opening and each outflow channel comprising an exit opening,
the membrane cell stack arrangement further comprising an internal fluid manifold system in communication with respective entry openings and exit openings of the inflow channels and outflow channels of the plurality of flow compartments, wherein the main flow channel has a main flow channel width, the entry opening has a width and the exit opening has a width, wherein entry opening width and exit opening width are each larger than 45% of the main flow channel width.

2. The membrane cell stack arrangement according to claim 1, wherein each of the plurality of flow compartments comprises closed edges and wherein the major inflow direction, the major outflow direction and the major main flow direction are substantially parallel to the closed edge(s) defining the inflow channel, the outflow channel and the main flow channel, respectively.

3. The membrane cell stack arrangement according to claim 1, wherein the predetermined angles of the major inflow direction to the major main flow direction and the major outflow direction to the major main flow direction are between 100° and 170°.

4. The membrane cell stack arrangement according to claim 1, wherein the major inflow direction is substantially parallel to the major outflow direction.

5. The membrane cell stack arrangement according to claim 1, wherein the major inflow direction is at an angle to the major outflow direction.

6. The membrane cell stack arrangement according to claim 1, wherein at least one of the membranes comprises a textured surface profile.

7. The membrane cell stack arrangement according to claim 1, wherein the membranes are ion exchange membranes.

8. The membrane cell stack arrangement according to claim 1, wherein major main flow directions of at least a part of adjacent flow compartments are in counter-current orientation.

9. The membrane cell stack arrangement according to claim 1, wherein the major main flow directions of at least a part of adjacent flow compartments are in cross-current orientation.

10. The membrane cell stack arrangement according to claim 1, wherein the major main flow directions of at least a part of adjacent flow compartments are in co-current orientation.

11. The membrane cell stack arrangement according to claim 1, wherein the housing comprises one of a circular cross-section; an elliptical cross-section; a rectangular cross-section; a polygonal cross-section.

12. The membrane cell stack arrangement according to claim 1, wherein inflow channels and outflow channels of a group of flow compartments having the same orientation of major main flow direction, major inflow direction and major outflow direction are in communication with an input channel and output channel respectively.

13. The membrane cell stack arrangement according to claim 12, wherein the input channel and the output channel are arranged parallel to the central axis.

14. The membrane cell stack arrangement according to claim 1, wherein the membrane cell stack arrangement comprises two, three, or four groups of flow compartments that are fluidly separate.

15. The membrane cell stack arrangement according to claim 1, wherein the membranes comprise an active area of rectangular shape.

16. The membrane cell stack arrangement according to claim 1, wherein the membranes comprise an active area of hexagonal shape.

17. The membrane cell stack arrangement according to claim 1, wherein one or more of the inflow and outflow channels are provided with flow guide elements.

18. The membrane cell stack arrangement according to claim 1, wherein each flow compartment comprises at least four straight sides and a corner recess between each two adjacent straight sides.

19. The membrane cell stack arrangement according to claim 1, wherein each of the plurality of flow compartments comprises closed edges and if two closed edges of an inflow channel or outflow channel are at an angle of $\gamma$ degrees relative to each other, then respectively the major inflow direction or major outflow direction of that channel is at an angle of $\frac{1}{2}\gamma$ degrees relative to those two closed edges.

20. A method of manufacturing a membrane cell stack arrangement according to claim 1, comprising the steps of:

providing the the housing having a central axis;

building a the stack of membranes, each membrane having a major membrane surface and being enclosed by the housing with the major membrane surface arranged substantially perpendicular to the central axis, providing the internal fluid manifold system; and installing the stack of membranes and the internal fluid manifold system in the housing such that the internal fluid manifold system is in communication with the respective entry openings and exit openings of the inflow channels and outflow channels of the plurality of flow compartments.

21. An electrodialysis device comprising the membrane cell stack arrangement according to claim 1.

22. A reverse electrodialysis device comprising the membrane cell stack arrangement according to claim 1.

* * * * *